United States Patent [19]

Rowe

[11] 4,376,949
[45] Mar. 15, 1983

[54] COLOR PROJECTION TV SYSTEMS

[75] Inventor: William A. Rowe, Palatine, Ill.

[73] Assignee: Zenith Radio Corporation, Glenview, Ill.

[21] Appl. No.: 272,581

[22] Filed: Jun. 11, 1981

[51] Int. Cl.³ .............................................. H04N 5/74
[52] U.S. Cl. .................................... 358/60; 358/237
[58] Field of Search ................... 358/60, 62, 64, 237, 358/231

[56] References Cited

U.S. PATENT DOCUMENTS

| 3,115,544 | 12/1963 | Marley | 358/60 |
|---|---|---|---|
| 3,949,167 | 4/1976 | Koyama | 358/60 |
| 4,004,093 | 1/1977 | Oland | 358/60 |
| 4,087,835 | 5/1978 | Nishimura | 358/60 |
| 4,192,216 | 3/1980 | Ohmori | 358/60 |
| 4,274,110 | 6/1981 | Lehnert | 358/60 |

FOREIGN PATENT DOCUMENTS 2656170  6/1977  Fed. Rep. of Germany ........ 358/60

OTHER PUBLICATIONS

Developments in Plastic Optics for Projection TV Systems, by Howe, presented at IEEE Chicago Fall Conference on Consumer Electronics, Nov. 13, 1979, pp. 1 to 9.

Primary Examiner—Tommy P. Chin

[57] ABSTRACT

A projection television system having three different primary color picture tubes in an in-line configuration, one centrally located on the projection screen axis and the other two on opposite sides of the axis. In order to compensate for the defocussing which these off-axis locations produce at the edges of the projected image, the off-axis picture tubes are rotated relative to the optical axes of their respective focussing lenses, thus rotating the corresponding projected images into coincidence with the projection screen. The off-axis positioning also produces color shading by making the square law fall-off in illumination vary across the projection screen, and also by producing a trapezoidal distortion which is compensated by pre-distortion which introduces additional color shading effects. The first effect is reduced by making the lenses tangent or nearly tangent to each other, thus minimizing the angular deviation of the projection axes. The second effect results from the use of slanted CRT electron guns to achieve the compensatory trapezoidal pre-distortion of the off-axis object images, and is corrected by laterally offsetting these object images (CRT rasters) from the optical axes of their focussing lenses. This off-set can be achieved by laterally displacing the entire picture tube, or by laterally displacing the electron gun relative to the tube faceplate, or by magnetically deflecting the electron beam. The degree of offset is preferably such as to equalize the distances of all object image corner points from the lens axis. The offset then must itself be compensated by rotating the off-axis lenses so that their optical axes are underconverged.

16 Claims, 15 Drawing Figures

COLOR PROJECTION TV SYSTEMS

This invention relates generally to television, and particularly to color television systems of the projection type.

BACKGROUND AND SUMMARY OF THE INVENTION

Television systems in which the picture tubes (CRT's) project their images upon a remote screen produce a greatly enlarged picture. Because of brightness problems encountered when a single three-color picture tube is used, color TV systems of the projection type commonly employ three different monochrome picture tubes, one for each of the three primary colors. But the three-tube design raises the question of how to achieve registration of the three different color images upon the projection screen.

One way of doing this is to use dichroic prisms to fold the light output of the three picture tubes into a common optical path. While this approach provides good image registration, the dichroic prisms reduce light transmission to levels generally considered unacceptable. The preferred approach to image registration is to arrange the three picture tubes side-by-side (the "in-line" configuration), with one of the tubes located on the axis of the projection screen and the other two located off-axis on either side thereof. The respective focussing lenses of the off-axis picture tubes are then skewed so that their optical axes converge on a central projection screen location. This arrangement produces a bright picture, but it directly or indirectly causes a number of problems which it is the object of this invention to solve or minimize.

One of these problems has to do with the coincidence of the three focal planes. Because of the skewed orientation of the off-axis focussing lenses, their projected images have focal planes which do not coincide with the projection screen. Instead, these focal planes are rotated so that they diverge from the screen at the lateral edges thereof.

In the past, system designers have used relatively slow f/2, lenses, and depended upon the resulting depth of focus to prevent this divergence from being noticeable. But recently they have experimented with faster f/1 lenses, which yield a brighter picture but have less depth of focus. With such lenses the amount of defocussing at the lateral edges of the screen is noticeable.

In accordance with one aspect of this invention, this defocussing problem is dealt with by rotating each off-axis picture tube image relative to its focussing lens, until its projected image becomes congruent with the projection screen surface.

U.S. Pat. No. 4,194,216 of Ohmari shows a partially in-line color projection TV system in which the picture tubes are skewed with respect to the optical axes of the lenses. But the Ohmari system employs parallel-axis focussing lens assemblies; and such a system does not have the problem of skewed focal planes with which this invention is concerned. Ohmari rotates the picture tubes with respect to the optical axes of the lenses for an entirely different purpose; i.e., to compensate for trapezoidal distortion of the projected images.

Another problem which results from the off-axis placement of some of the picture tubes in an in-line projection system is color shading at the extremes of the image on the projection screen. One cause of color shading is inherent in the off-axis position of two of the three image projectors. Whenever the axis of image projection is at an angle to the projection screen, a portion of the projected image which is on one side of the projection axis travels farther, and a portion which is on the opposite side of the axis travels less, than the axial distance from the image source to the projection screen. The half of each image which travels farther will therefore be darker than the other half, due to the fact that the intensity of illumination must fall off as the square of the distance from the light source. Since the two off-axis projectors are on opposite sides of the projection screen axis, the half of the composite image which is deficient in one of the off-axis colors will have an excess of the other off-axis color, and vice versa. Thus the two halves of the composite image will have opposite color imbalances.

A paper entitled "Developments in Plastic Optics for Projection Television Systems," by Roger L. Howe and Brian H. Welham, which was presented on Nov. 13, 1979 to the I.E.E.E. Chicago Fall Conference on Consumer Electronics, and which has been published by U.S. Precision Lens Incorporated, recognizes (on page 8) that this color shift is proportional to the angular separation of the lenses.

In accordance with another aspect of this invention, the effect of uneven square law fall-off can be reduced by designing the system so that the angular deviation of the off-axis projectors from the projection screen axis is held to the minimum which is compatible with manufacturing tolerances and other design requirements.

Color shading also results as an undesirable by-product of a technique which is used to compensate for trapezoidal distortion. The off-axis images tend to be trapezoidally distorted (i.e., rectangles on the CRT screen tend to appear as trapezoids on the projection screen) owing to the fact that so far as the off-axis images are concerned, the projection screen is not perpendicular to the axis of image projection.

Such trapezoidal (or keystone) distortion can be minimized, but not eliminated, by clustering the picture tubes closely together as suggested in Oland U.S. Pat. No. 4,004,093. Or it can be compensated by laterally offsetting the picture tubes from their focussing lenses, as disclosed in the Ohmari patent mentioned above and also in Nishimura U.S. Pat. No. 4,087,835. The preferred method of compensation for trapezoidal distortion, however, is by trapezoidally pre-distorting the image on the CRT in the opposite sense, which restores the desired rectangular shape on the projection screen.

There are various techniques for accomplishing such compensatory pre-distortion. For example, it can be done electrically by varying the sweep signal amplitude as suggested in Koyama U.S. Pat. No. 3,949,167, or magnetically by altering the shape of the deflection coil field as suggested in Marley U.S. Pat. No. 3,115,544. But the preferred pre-distortion technique is to employ at each off-axis position a picture tube the electron gun of which is slanted relative to the tube's faceplate and phosphor screen. This approach is described in U.S. Pat. No. 4,274,110 of Stanley Lehnert, entitled "Projection Television System". The slanted electron gun produces the desired trapezoidal predistortion; but it also promotes color shading, for the following reasons.

It is an inherent property of the lenses which are used to focus the projected images that the illumination reaching the projection screen from each lens is highest at the optical axis of the lens, and falls off at any distance from that axis as the fourth power of the cosine of the angle of deviation therefrom, an effect known as optical vignetting. Illumination can also fall off abruptly at the extremes of the projected image as a result of mechanical vignetting. This can occur when some of the lens elements are not large enough. Manufacturing variations in the thickness of the CRT phosphor screen and of the aluminization layer on the CRT faceplate also contribute to vignetting. Because of the way it is made, the phosphor layer tends to be thinner, and therefore to emit less light, at the edge of the CRT screen than in the middle. Furthermore, the oblique angle of incidence of the electrons on the phosphor screen nearer the edges thereof reduces the depth of penetration of the electrons. In addition, reflection from the lens elements causes greater light losses at the extremes of the image than it does in the center, because of the less favorable angle of incidence. For all these reasons, all three of the different colored images are brighter in the center of the projection screen than they are at the edges thereof. Moreover, this effect is more pronounced in the larger aperture (e.g. f/1) lenses, which are coming into greater use.

If it were not for the trapezoidally pre-distorted rasters, all three of the colored images would exhibit the same variation of brightness as a function of position on the projection screen, and therefore no change in color balance would occur across the projected image. But such pre-distortion of the off-axis images has the effect of increasing the displacement from the center of the CRT raster of each image point on the enlarged end of the trapezoid and decreasing that displacement as to each image point on the reduced end of the trapezoid. These increases and decreases in image point displacement on the CRT screen then (because of the angular brightness variations introduced by the various sources of vignetting described above) are translated into differences in brightness on the projection screen. Image points on the enlarged side of the trapezoid (as it appears on the CRT) are reduced in brightness during passage through the projection lens because of their increased displacement from the lens axis, while image points on the reduced side of the trapezoid are increased in brightness for the converse reason. Thus, upon emerging from their projection lenses the off-axis images suffer from a brightness gradient extending from one edge to the opposite edge. When these images fall on the projection screen, the trapezoidal pre-distortion is corrected but the brightness gradient is not.

Moreover, the brightness gradients of the two off-axis images are oppositely directed, because their CRT pictures are trapezoidally distorted in opposite directions. Therefore each one of the off-axis colored images increases in brightness toward that edge of the projection screen where the other off-axis colored image decreases. The result is a color gradient which produces one tint at one edge and the opposite tint at the opposite edge. True color balance between the two off-axis colored images occurs only in the center of the projection screen. In a typical projection TV system employing an f/1 lens, variations of as much as 10% in light transmission can occur at the image edges, producing noticeable color imbalances.

In accordance with another aspect of this invention, the color shading problem is dealt with by offsetting the object image on the CRT face from the optical axis of its lens assembly. This distorts the CRT image as seen from the lens assembly and, when the offset is in the proper direction, is equivalent to moving the image points in the large end of the trapezoid closer to the optical axis and the image points in the small end further away, thus correcting the brightness bias which results from the previously unequal distances of these two sets of image points from the optical axis.

In the Ohmari and Nishimura patents cited above, the picture tubes are laterally displaced relative to their focussing lens optical axes, but again this is done for an entirely different purpose: i.e. to reduce the trapezoidal distortion.

These and other features of the invention will be more fully appreciated from the following detailed description, when read in conjunction with the accompanying drawings.

DETAILED DESCRIPTION OF THE PREFERRED EMBODIMENTS

Figure 1:
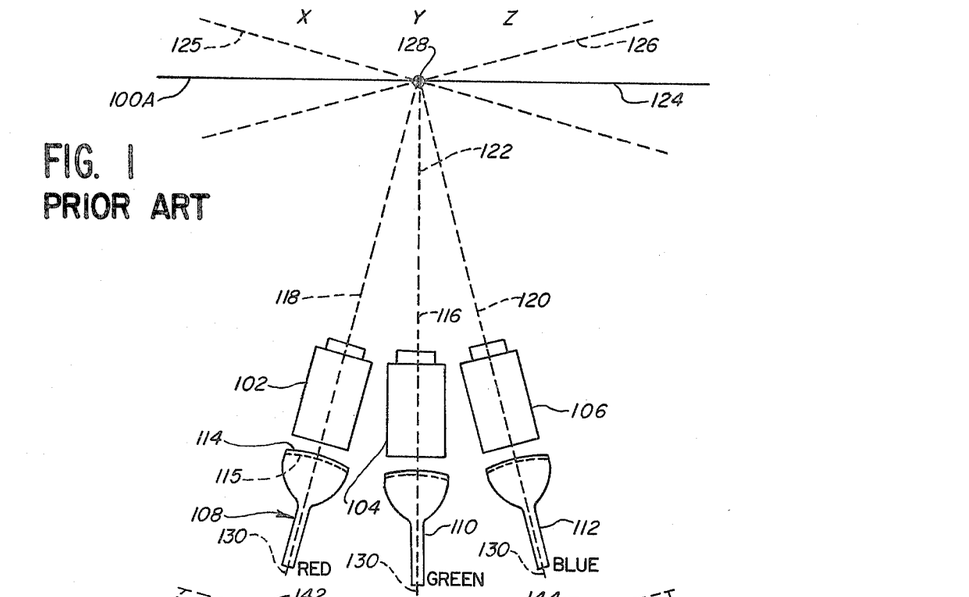
FIG. 1 is a schematic top plan view of an in-line three-tube color projection TV system of the conventional kind, which suffers from edge defocussing of the off-axis images.

FIG. 1 shows the basic geometry of an in-line projection TV system of the conventional type, as it would appear when viewed from above. Three monochrome images in the primary colors (red, green and blue) are simultaneously projected upon a screen 100 by respective focussing lens assemblies 102, 104 and 106. The object images for these lens assemblies are provided by a red monochrome picture tube 108, a green monochrome picture tube 110 and a blue monochrome picture tube 112, respectively. Each of these picture tubes is a conventional cathode ray tube (CRT) having a faceplate 114, on the inside surface of which is a phosphor screen 115 which is luminescent at the wavelength of the respective primary color.

Another way of describing this arrangement is to say that the centrally located lens assembly 104 and CRT 110 together comprise a projector which is situated orthogonally relative to the screen 100, while two outboard projectors 102, 108 and 106, 112 respectively are in non-orthogonal relationships to the screen 100.

This arrangement is also referred to as an "in-line", configuration because of the fact that the three CRT's and the three focussing lens assemblies are placed side-by-side in a horizontal line.

While this is a preferred geometry for color projection television systems, it suffers from the basic problem that each projector, that is, each combination of a focussing lens assembly and its associated CRT, has an optical axis which does not coincide with the optical axis of any other projector. Thus, lens assembly 104 defines an optical axis 116, lens assembly 102 defines an optical axis 118, and lens assembly 106 defines an optical axis 120. The central one of the three projectors (in this case, the green projector 104, 110) is located so that its optical axis 116 is substantially perpendicular to the focussing screen 100. That is to say, that the optical axis 106 of the central projector coincides substantially with the normal axis 122 of the projection screen 100. The normal axis 122 is a line which is perpendicular to the plane of the projection screen 100 and passes through the center of that screen.

Projector 104, 110 is designed to focus the projected green image upon rear surface 100A of the projection screen 100. (The conventional rear projection geometry is employed, in which the viewers are located at positions such as X, Y, and Z on the opposite side of the projection screen). Because the optical axis 116 of this projector coincides with the normal axis 122 of the projection screen, the projected image plane 124 of this axial projector (that is the imaginary surface upon which the green projected image is focussed) coincides with the projection screen surface 100A.

The red and blue projectors are located adjacent the green projector and on opposite sides thereof; for example, as seen in FIG. 1, with the red projector on the left and the blue projector on the right, as seen from above. Thus, the red projector is arranged so that its optical axis 118 is offset to the left, and rotated clockwise, relative to the green optical axis 116, with respect to the view of FIG. 1. Similarly, the blue projector is arranged with its optical axis 120 offset to the right of the green optical axis 116 and rotated counterclockwise relative thereto. Specifically, the outboard lens assemblies 102 and 106 are skewed so their optical axes 118 and 120 respectively intersect the projection screen 100 at a point 128 which is at the center of that screen, where axes 116 and 122 also intersect that screen.

Because of this skewed lens orientation, the red image focal plane 125 does not coincide everywhere with the desired projection screen surface 100A, nor does the blue image focal plane 126. The three image planes 124, 125 and 126 intersect each other along a vertical line passing through the center point 128. But at all locations left and right of that center line, the red and blue image planes 125 and 126 respectively do not coincide with the projection screen surface 100A, nor the green projected image plane 124. As a result, there will be defocussing at all laterally off-center locations, the extent of which increases with lateral distance from the center line which passes through point 128.

In FIG. 1 the degree of angular divergence of the off-axis projected image planes 125 and 126 from the axial projected image plane 124 is exaggerated for the sake of clarity of illustration. In the past such lack of coincidence between the image planes has been less of a problem because the focussing lens assemblies 102, 104 and 106 were relatively slow, i.e. with apertures not exceeding f/2. But now attempts are being made to increase the brightness of color projection TV displays by employing lenses with apertures as large as f/1. These higher speed lenses have a shallow depth of focus, and as a result the defocussing which results from the noncoincidence of the off-axis projected image planes becomes noticeable near the lateral edges of the projection screen 100.

In accordance with one aspect of this invention, this edge defocussing problem is dealt with by rotating the off-axis CRT's 108 and 112 in the proper direction to rotate their respective projected image planes 125 and 126 into coincidence with the desired projection screen surface 100A and the axial projected image plane 124. In the prior art configuration of FIG. 1, each tube 108, 110 and 112 was oriented so that the tube faceplate axis coincided with the optical axis of the associated focussing lens assembly 102, 104 or 106. Thus, in FIG. 1 axis 130 of the faceplate of tube 108 coincides with optical axis 118 of lens assembly 102, axis 130 of the faceplate of tube 110 coincides with optical axis 116 of lens assembly 104 (and also with the normal axis 122 of the projection screen), and axis 130 of the faceplate of tube 112 coincides with optical axis 120 of lens assembly 106. But in the inventive arrangement depicted in FIG. 2, the red picture tube 108 has been rotated so that its faceplate axis 130 is at an angle 136 relative to the optical axis 118 of the associated focussing lens assembly 102. The axial picture tube 110 is left in the same position as it occupied in FIG. 1, but the other off-axis picture tube 112 is rotated so that its faceplate axis 130 makes an angle 136 relative to the optical axis 120 of its associated focussing lens assembly 106. Notice that in each case the off-axis picture tube 108 or 112 is rotated in such a direction that its electron gun 140 moves laterally away from the axial picture tube 110, while its faceplate portion 114, upon which the object image appears, remains adjacent to its associated lens assembly 102 or 106, although rotated relative thereto.

Figure 2:
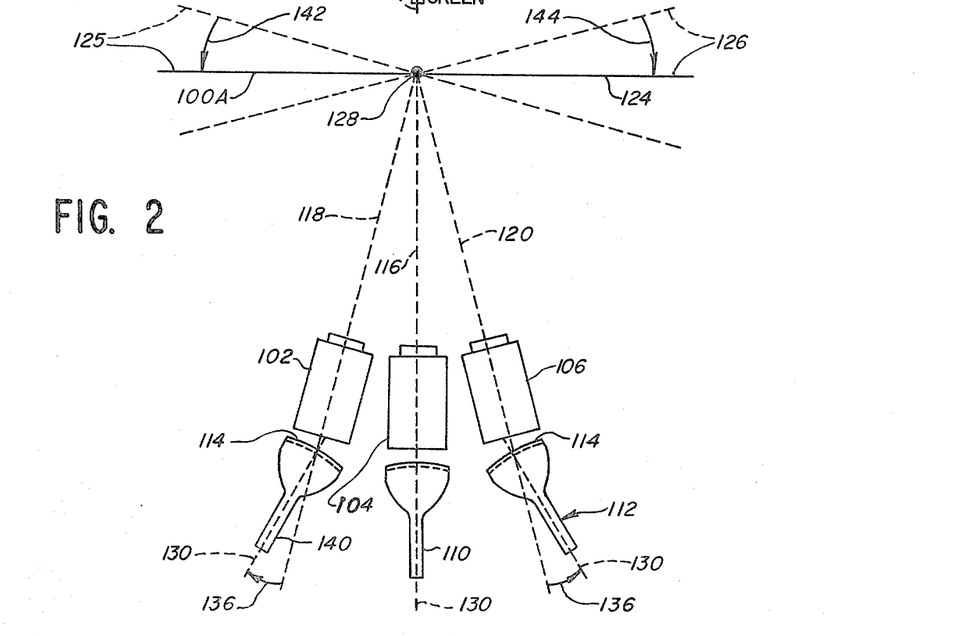
FIG. 2 is a similar view of a system in accordance with one aspect of this invention in which the off-axis picture tubes are rotated to restore focal plane coincidence.

This design has the result of rotating the red projected image plane 125 and the blue projected image plane 126 into coincidence with the projection screen surface 100A, as indicated by arrows 142 and 144 respectively. As a result, the off-axis projected image planes 125 and 126 now coincide with the axial projected image plane 124, and the edges of the off-axis and axial images are consequently focussed upon a common plane.

In a particular TV system constructed in accordance with this invention, for example, where the outer lenses were already skewed 6.8° relative to the center lens, an additional 0.8° of skew improved the image spot size from 0.24 inches to theoretical focus.

Figure 3:
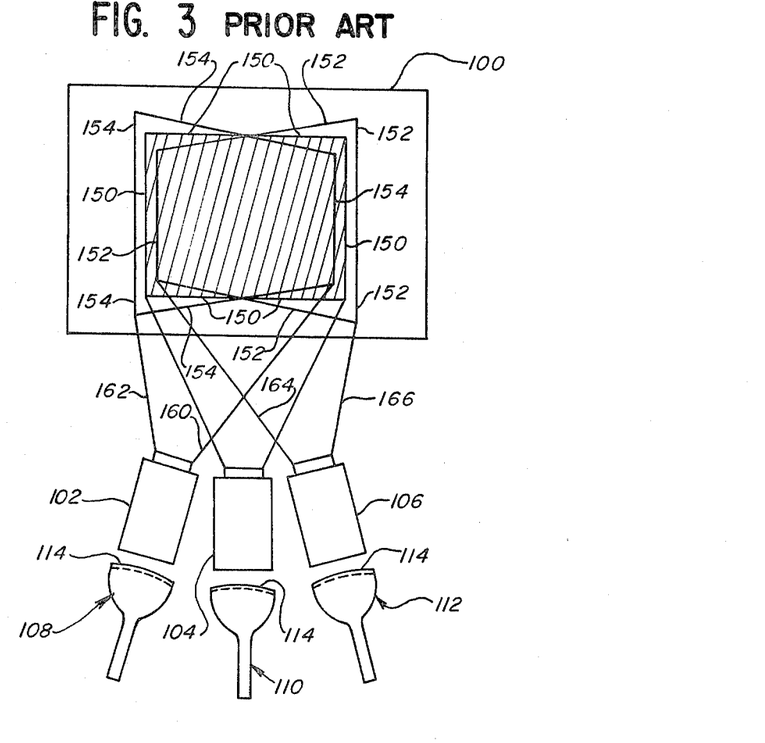
FIG. 3 is a partly top plan view and a partly front elevational view of a conventional in-line color projection TV system which suffers from trapezoidal distortion of the off-axis images.

The off-axis location of picture tubes 108 and 112 causes other problems beside defocussing. FIG. 3 illustrates the same prior art projection color TV system as FIG. 1 and offers the same top view of the three projectors, but has the projection screen 100 tilted back so that the projected images upon the surface 100A can be seen. It therefore becomes apparent that the axially located projector 104, 110 projects a rectangular image frame 150 (shaded area) upon the projection screen surface 100A. Moreover, all other rectangular shapes within the object image appearing on the faceplate 114 of picture tube 110 are projected as rectangular shapes upon the projection screen surface 100A.

But not so with the off-axis projectors 102, 108 and 106, 112. In their case all shapes within the object image on the CRT faceplate 114 are distorted trapezoidally when they reach the projection screen surface 100A. Thus, the rectangular object image frame of left projector 102, 108 appears upon the projection screen as the trapezoidal shape enclosed by lines 152. Note that the right side of this trapezoidal area is enlarged, while the left side of it is reduced in size, compared to rectangle 150. Similarly, the rectangular image frame of the right projector 106, 112 is projected upon screen 100 as a trapezoidal area enclosed by lines 154. Here the direction of the distortion is reversed, so that the left side of the trapezoid is larger, while the right side is smaller.

In each case, the trapezoidal distortion results from the fact that one side of the off-axis projected image must travel further to reach the projection screen than does the other side. In the case of focussing lens assembly 102, the right side of its projected image has to travel over a light ray path 160 which is longer than the light ray path 162 traveled by the left side. Similarly but conversely, the left side of the image projected by focussing lens assembly 106 must travel a longer light ray path 164 than the path 166 traveled by the right side of that projected image.

Figure 4:
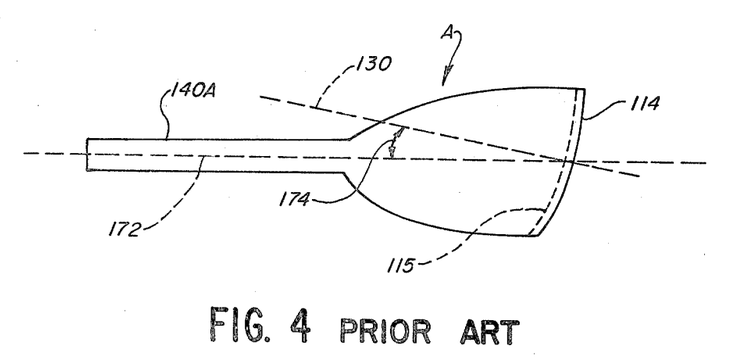
FIG. 4 is a schematic top plan view of a prior art TV picture tube having a slanted electron gun.
Figure 5:
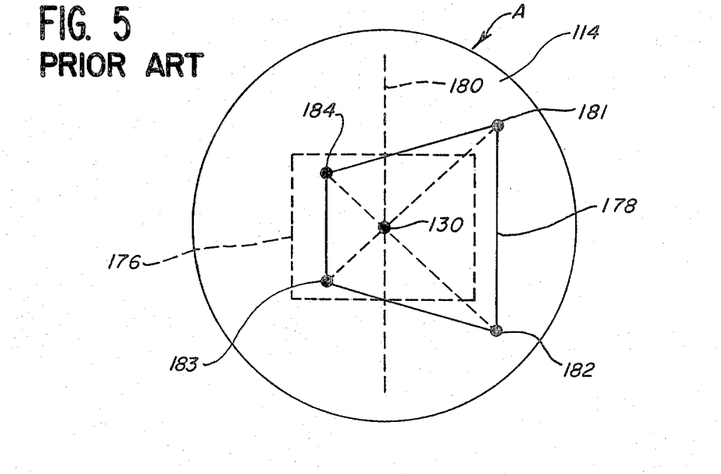
FIG. 5 is a front elevation view of the image raster of the picture tube of FIG. 4 showing the compensatory trapezoidal pre-distortion thereof, which results in elongation of lateral dimensions on one side, and compression of such dimensions on the other side, of the electron beam axis.

This trapezoidal distortion causes large portions of the off-axis projected images 152 and 154 respectively to be out of registration, that is non-congruent with the axial projected image 150. This situation cannot be tolerated, and was not tolerated by the prior art. The preferred solution to this problem is the use of a picture tube with a slanted electron gun in each of the off-axis projectors. A prior art picture tube A of this type is depicted in FIGS. 4 and 5.

The pictures tubes illustrated in FIGS. 1 through 3 all had electron guns which had a common axis (axis 130) for both the faceplate 114 and the electron gun 140. But the picture tube A has an electron gun assembly 140A, the axis 172 of which is at an angle 174 to the axis 130 of faceplate 114. This angular displacement of the electron gun causes the object image appearing on the faceplate 114 to be trapezoidally distorted as illustrated in FIG. 5.

The latter drawing is a direct view of the faceplate 114 of the tube A, and shows in dashed lines the rectangular shaped object image frame 176 which would have resulted if the electron gun 140A were not slanted in the manner described. A solid line representation depicts the trapezoidally distorted shape 178 of the same object image frame which is actually produced upon the faceplate 114 as a result of the gun slant. As is well understood in the art, the slant angle is chosen so that the trapezoidal distortion of the object image frame 178 is of an appropriate magnitude and direction to compensate for the trapezoidal distortion of the projected image frames (lines 152 and 154) seen in FIG. 3. In other words, the trapezoidal distortion of object image frame 178 is calculated to compensate for the trapezoidal distortion of the projected image frame.

Figure 6:
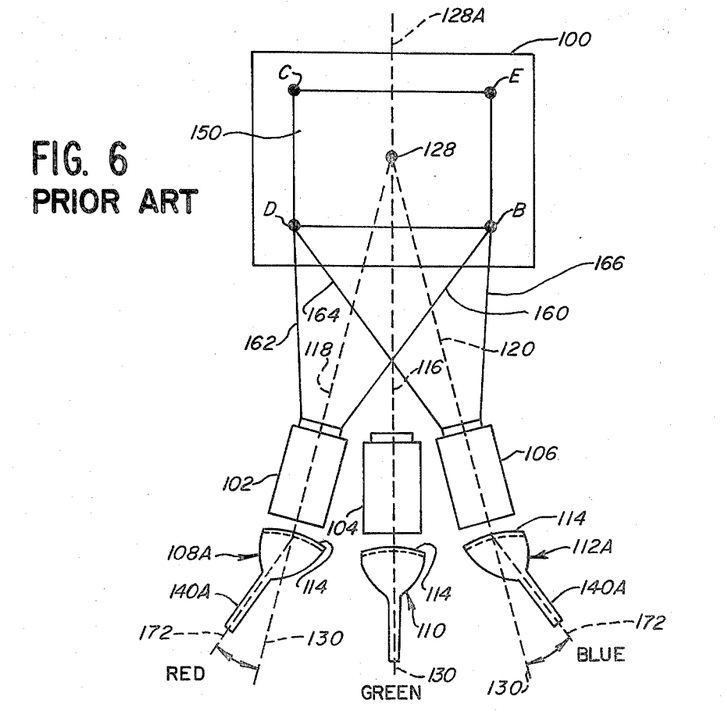
FIG. 6 is a schematic view similar to FIG. 3 of a conventional in-line color projection TV system employing picture tubes of the type illustrated in FIGS. 4 and 5 to compensate for trapezoidal distortion, but which consequently suffers from color shading produced by various types of vignetting.

The resulting rectification of the projected image is illustrated in FIG. 6. There it is seen that when the two outboard picture tubes 108 and 112 are replaced by picture tubes 108A and 112A having respective slanted electron guns 140A, then both of the outboard image frames are corrected to the same rectangular configuration 150 as that of the axial projector 104, 110.

While this technique corrects the problem of trapezoidal distortion, it simultaneously introduces another problem, that of color shading. As illustrated in FIG. 5, the slanted electron gun of tube A not only causes rectangular image frame configuration 176 to be distorted into trapezoidal image frame configuration 178, but it also displaces each image point which is not located directly on a vertical bisector 180 passing through the faceplate axis 130. All image points within the object image frame (or CRT raster) 178 which are located on the enlarged (right) side of bisector 180 have their distances from that bisector exaggerated, while all image or raster points which are on the reduced (left) side of the distorted image raster 178 have their distances from the bisector 180 reduced. Raster corner points 181 through 184 may be conveniently used to illustrate what happens to all the image points within the CRT raster 178. Corner points 181 and 182 (and all other image points which are on the trapezoidally enlarged right hand side of raster 178) are moved out to a greater distance from the bisector 180, while corner points 183 and 184 (and all other image points on the reduced left hand side of the trapezoidally distorted raster) are moved in closer to the bisector 180.

For reasons explained in the introductory portion of this specification, this displacement of the image points results in a brightness gradient extending laterally across the projected image frame 150 for the two images projected by the outboard projectors 102, 108A and 106, 112A respectively. Thus, apart from signal variations, the right-hand corners E and B of the projected image frame 150 (and all other image points on the right-hand side of vertical bisector 128A of projection screen 100) are more brightly illuminated by the blue light projected by the right-hand projector 106, 112A than are the left-hand corners C and D (and all other image points on the left-hand side of bisector 128A). This fact is schematically represented by showing the brighter corner E as an open circle and the darker corner C as a filled-in dot. (The upper corners E and C are arbitrarily selected to illustrate the brightness gradient produced by left-hand projector 102, 108A; and the lower corners B and D are arbitrarily selected to illustrate the brightness gradient produced by right-hand projector 106, 112A.) Similarly but conversely, the left-hand corners C and D (and all other image points on the left side of bisector 128A) are more intensely illuminated by the red light of the left-hand projector 102, 108A than are right hand corners E and B (and all other image points on the right side of bisector 128A). This again is schematically illustrated by showing the brighter corner D as an open circle and the darker corner B as a filled-in dot.

In accordance with another aspect of this invention, the problem of color shading resulting from brightness gradients introduced by the slanted electron gun 140A is dealt with by translating the off-axis object images to positions which are laterally offset from the axes of their respective focussing lens assemblies. Why this remedy is effective is perhaps best appreciated by referring back once again to FIG. 5. This illustration shows that all the image points, both those (such as corner points 181 and 182) which are on the right-hand side of bisector 180 and those (including corner points 183 and 184) which are on the left-hand side of bisector 180, are displaced in the same direction, that is, to the right with respect to the view of FIG. 5, even though the image points (e.g. corners 181 and 182) on the right-hand side of the bisector 180 are moved further away from the bisector, and the image points (e.g., corners 183 and 184) on the left-hand side of the bisector 180 are moved closer to the bisector. Since all the image points are displaced in a single direction, this displacement can be corrected by moving the entire image raster 178 an appropriate distance in the opposite direction relative to the associated off-axis focussing lens assembly 102 or 106.

There are at least three different ways that the required displacement of the object image raster 178 can be accomplished: by relocating the entire picture tube relative to its focussing lens assembly, by relocating the axis of the electron gun relative to the axis of the faceplate and phosphor screen, or by relocating the image raster relative to the electron gun and the faceplate through deflection de-centering. It should be noted, however, that deflection de-centering changes the angle of electron beam incidence on the screen and this effect must be taken into account in the overall system design.

Figure 7:
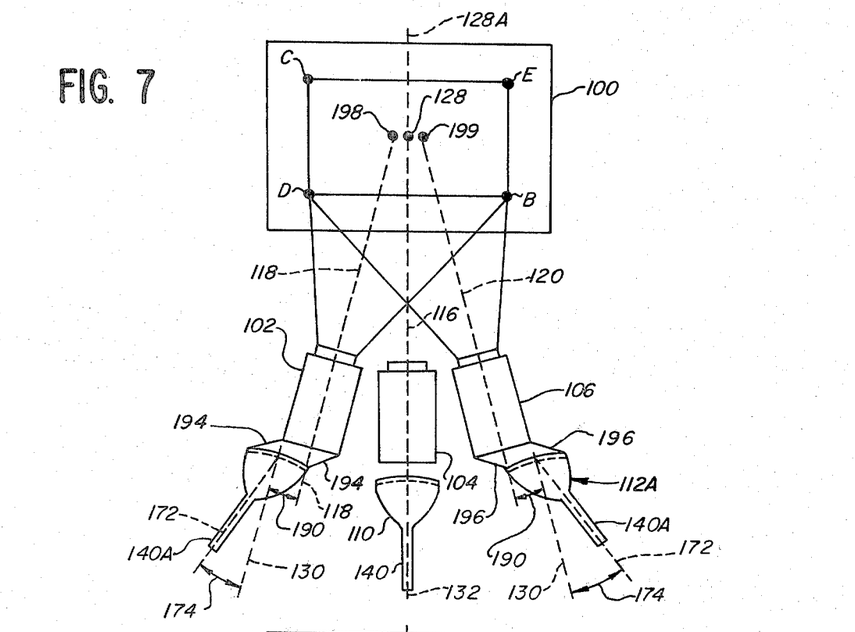
FIG. 7 is a similar view of a TV system in accordance with another aspect of this invention in which the slanted gun picture tubes are laterally offset relative to their focussing lenses in order to compensate for color shading caused by vignetting, and these focussing lenses are underconverged to compensate for the resulting displacement of their object image.

FIG. 7 illustrates the first of these methods, which is the preferred approach. The left outboard picture tube 108A is shifted laterally to the left so that its faceplate axis 130 is parallel to the optical axis 118 of its associated lens assembly 102, but displaced therefrom by a distance 190. The right outboard picture tube 112A is shifted to the right so that its faceplate axis 130 is parallel to the optical axis 120 of its associated focussing lens assembly 106 but displaced therefrom by a distance 190. Consequently, lens assembly 102 "sees" its CRT object image displaced to the left and lens assembly 106 "sees" its CRT object image displaced to the right, as indicated by sight lines 194 and 196 respectively. The displacement distance 190 is calculated to compensate for the displacements of all the image points (such as corner points 181 through 184) illustrated in FIG. 5. The result is that each outboard picture tube 108A and 112A illuminates the entire projected image frame 150 evenly from left to right as seen in the view of FIG. 7. This is schematically represented by showing all the projected image corner points B through E as of equal brightness.

While this technique corrects the brightness gradients which contribute to color shading, if preventive measures were not taken it also would have the undesired effect of shifting the projected image of picture tube 108A to the right of image frame 150 and the projected image of picture tube 112A to the left of picture frame 150, as seen in the view of FIG. 7, thus causing a loss of registration of the two outboard projected images relative to the projected image of central picture tube 110.

In order to prevent this, the outboard lens assemblies 102 and 106 are rotated so that their optical axes 118 and 120 respectively are underconverged relative to the optical axis 116 of the axial focussing lens assembly 104. The left lens assembly 102 is rotated to the left so that its optical axis 118 intersects the projection screen 100 at a point 198 which is located on the left side of the projection screen vertical bisector 128A. Similarly but conversely, the right-hand outboard focussing lens assembly 106 is rotated to the right so that its optical axis 120 intersects the projection screen 100 at a point 199 which is to the right of the bisector 128A. Rotating the left lens assembly 102 to the left shifts its projected image to the right, while rotation of the right lens assembly 106 to the right shifts its projected image to the left. This moves both images back into the desired image frame 150, and thus into registration with the projected image of axial picture tube 110.

There are other methods for displacing a CRT image, in addition to displacing the entire CRT as just described. The alternative embodiment illustrated in FIG. 8 employs outboard picture tubes 108B and 112B which have electron gun assemblies 140B that are not only rotated as in the case of gun assemblies 140A, but also are asymmetrically located relative to their respective faceplates 114. The axes 130 of faceplates 114 of these tubes 108B and 112B coincide with the optical axes 118 and 120 of their associated lens assemblies 102 and 106 respectively. But their electron gun axes 172B are offset from faceplate axes 130 so that respective points F and G at which these axes intersect faceplates 114 are offset laterally by distances 190. This in turn causes the image rasters of tubes 108B and 112B to be shifted to the left and right respectively, relative to axes 130 of their respective faceplates 114. As a result, the object image rasters are "seen" by their respective lens assemblies 102 and 106 along sight lines 194 and 196 respectively.

Figure 8:
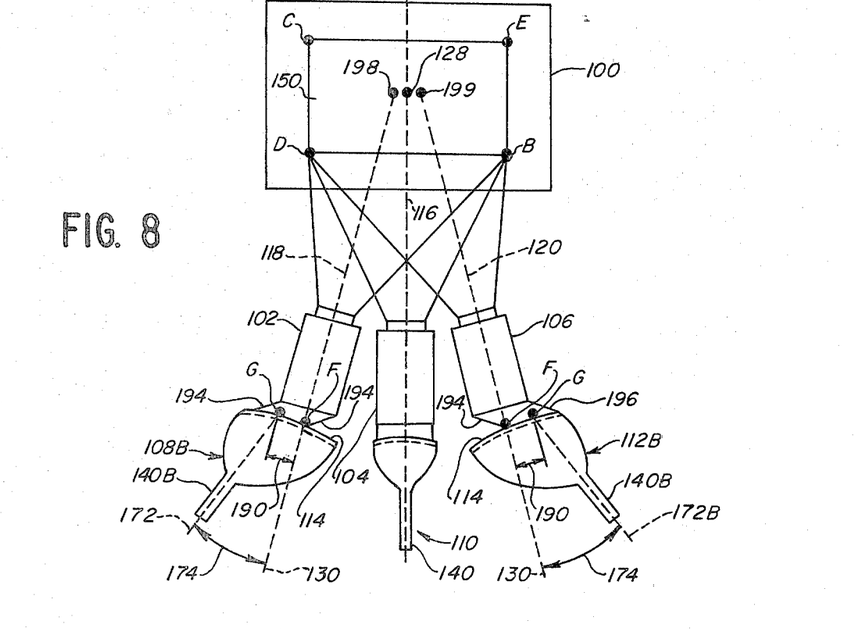
FIG. 8 is a similar view of an alternative TV system in accordance with the same aspect of this invention in which the same object image offset is achieved by using picture tubes with offset and slanted electron guns.

As in FIG. 7, the embodiment of FIG. 8 requires the lens assemblies 102 and 106 to be underconverged relative to the optical axis 116 of the axially located projector 104, 110. Thus optical axes 118 and 120 intersect projection screen 100 at off-center points 198 and 199 respectively.

Figure 9:
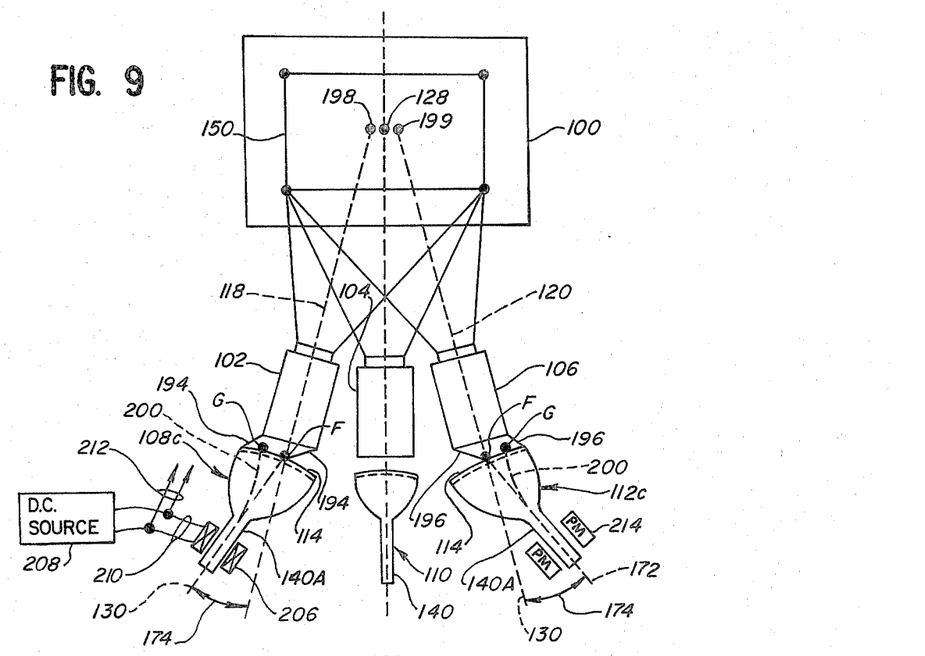
FIG. 9 is a similar view of another alternative TV system in accordance with the same aspect of this invention in which the same object offset is achieved by deflection centering, employing either electro-magnets or permanent magnets.

The additional alternative embodiment of FIG. 9 employs deflection de-centering to bias the cathode ray tube electron beams to one side of each picture tube 108C and 112C. These tubes are similar in construction to tubes 108A and 112A, but they have means for exerting a unidirectional magnetic deflection force to curve their respective electron beams into off-center electron beam paths 200.

In the case of the left outboard picture tube 108C, the electron beam path 200 is shifted to the left of the tube axis 172, while in the case of the right outboard picture tube 112C the electron beam axis 200 is shifted to the right of the picture tube axis 172. As a result, the left object image center shifts to point G at the left side of its faceplate 114, and is "seen" by lens assembly 102 along sight lines 194, while the right object image center shifts to point G at the right of its faceplate 114 and is "seen" by its lens assembly 106 along sight lines 196. The distance from points G to points F (at the centers of the faceplates 114) is equivalent to distance 190 in FIGS. 7 and 8.

The unidirectional magnetic field which is required for deflection de-centering of the electron beams can be provided either by a D.C. energized electromagnet, or by a permanent magnet. The first technique is utilized in connection with picture tube 108C, which has a deflection coil 206 associated with its electron gun 140A and energized by a D.C. source 208. Lines 210 connect the D.C. source to the deflection coil 206, and lines 212 are available to connect the same D.C. source to a similar deflection coil for use with the other off-axis picture tube 112C. However, for the sake of illustrating the alternative deflection de-centering technique, picture tube 112C has a permanent magnet 214 associated with its electron gun 140A to achieve the same effect. In this embodiment also, the off-axis lens assemblies 102 and 106 are underconverged so that their optical axes 118 and 120 are aimed at off-center points 198 and 199, respectively.

Figure 10:
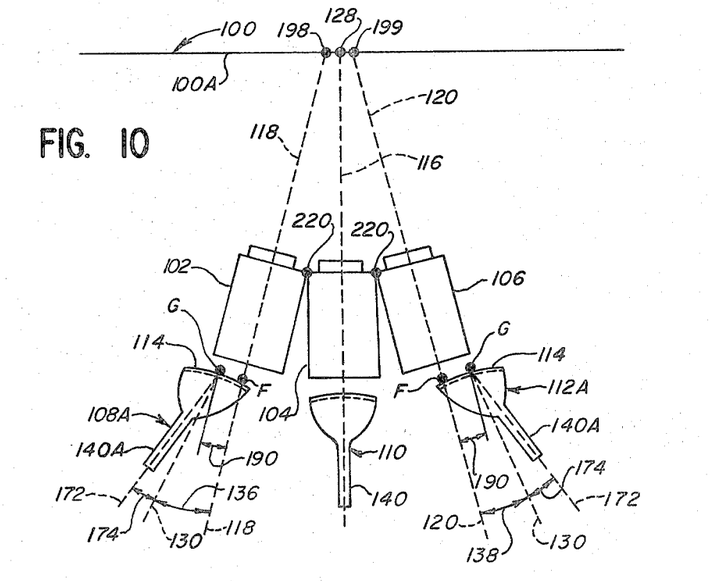
FIG. 10 is a similar view of another TV system in accordance with all aspects of this invention, which combines the features of FIGS. 2 and 7 and also reduces residual color shading by minimizing the physical separation of the three focussing lenses.

The preferred embodiment of this invention is illustrated in FIG. 10 which shows a projection color TV system incorporating the features of both FIG. 2 and FIG. 7. Thus, the outboard picture tubes 108A and 112A are rotated so that their faceplate axes 130 make angles 136 with the optical axes 118 and 120 of their lens assemblies 102 and 106 respectively, in order to make the off-axis image planes coincide with the surface 100A of projection screen 100; and in addition points G where axes 130 intersect the faceplates 114 are laterally off-set from points F on the optical axes 118 and 120 by distances 190 so that color shading is avoided despite the use of electron guns 140A the axes 172 of which are rotated through angles 174 to compensate for trapezoidal distortion. Here again the lateral shifting of the object images requires that the lens assemblies 102 and 106 be underconverged by aiming their optical axes 118 and 120 at off-center points 198 and 199. Thus, all of the inventive features discussed above are incorporated simultaneously into the system illustrated in FIG. 10.

There is, however, an additional source of color shading in addition to the slanted gun technique. For the reason described above in the introductory portion of this specification, the mere fact that projectors 102, 108A and 106, 112A in FIG. 10 are located off-axis (i.e. that axes 118 and 120 do not coincide with axis 116) inherently results in a residual amount of color shading which cannot be eliminated by object image displacement (distances 190).

In accordance with another aspect of this invention, however, color shading is reduced by minimizing the lateral offset between the axial lens assembly 104 and each of the off-axis assemblies 102 and 106. The distance between the closest corners of lens assemblies 102 and 106 and lens assembly 104 is held to an absolute minimum: i.e. zero plus any separation unavoidably introduced by manufacturing tolerances. In the ideal case, that is, in those instances when all the tolerances add up in the direction of reducing the corner-to-corner separations, the closest corners of the lens assemblies would be tangent at points 220. Under these circumstances the angular displacements between the central axis 116 and each of the two outboard axes 118 and 120 are reduced to their minimum value, and color shading is held to its practical minimum.

The system of FIG. 10 must be designed for minimum lens separation while at the same time achieving the proper underconvergence angles of the outboard focussing lenses 102 and 106 relative to the axial lens 104, and also achieving the proper lateral separations 190 and the proper angular rotations 136 for the outboard picture tubes 108A and 112A relative to their lens assemblies 102 and 106 respectively. Therefore, the following mathematical design procedure should be used for determining the key design parameters of the color projection TV system illustrated in FIG. 10.

Figure 11:
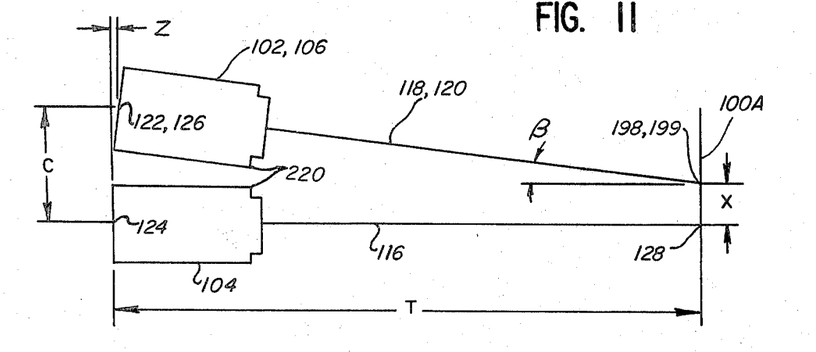
FIGS. 11 through 15 are geometric diagrams used to define parameters which must be calculated in order to design the TV system of this invention.

The points 122, 124 and 126 which will be used to define the locations of the lenses 102, 104 and 106 are located at the intersections of the respective optical axes 116, 118 and 120 with the respective rear surfaces of these lenses, as illustrated in FIG. 11. The separation between points 124 and 122 on 126 is resolved into two components, Z, the component along the axis 116 of the central lens 104, and C, the orthogonal component or lateral offset of the lens. The distance from point 124 to the point 128 where axis 116 intersects screen surface 100A is designated T and selected for the appropriate magnification of the object.

Figure 12:
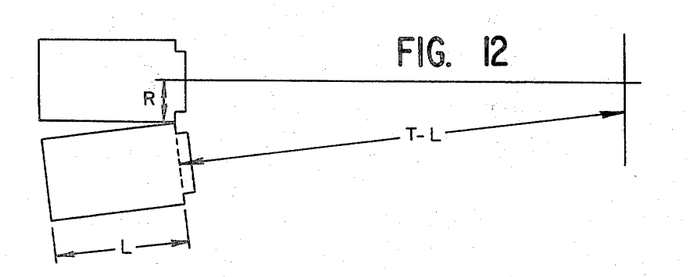

Also indicated in FIG. 11 are points 220 which represent the extreme corners of the lens housings, i.e. the points which become tangent as the lens and tube assemblies are brought together in accordance with this invention. As seen in FIG. 12, these points are radially displaced a distance R from the axes of the lenses and axially displaced a distance L forward of the rear surfaces of the lenses.

The separation of the points 128 and 198 or 199, i.e. the intersections of the lens axes and the screen surface 100A, is designated X, and the angle between the lens axes 116 and 118 or 120 is designated $\beta$. The relationship among these quantities is given by $$Z = T - T \cos \beta$$

$$C = X + T \sin \beta$$

FIG. 12 also illustrates the additional relationship resulting from reducing the separation of lenses to a minimum, i.e. as points 220 converge:

$$X + (T-L) \sin B = R + R \cos B$$

Figure 13:
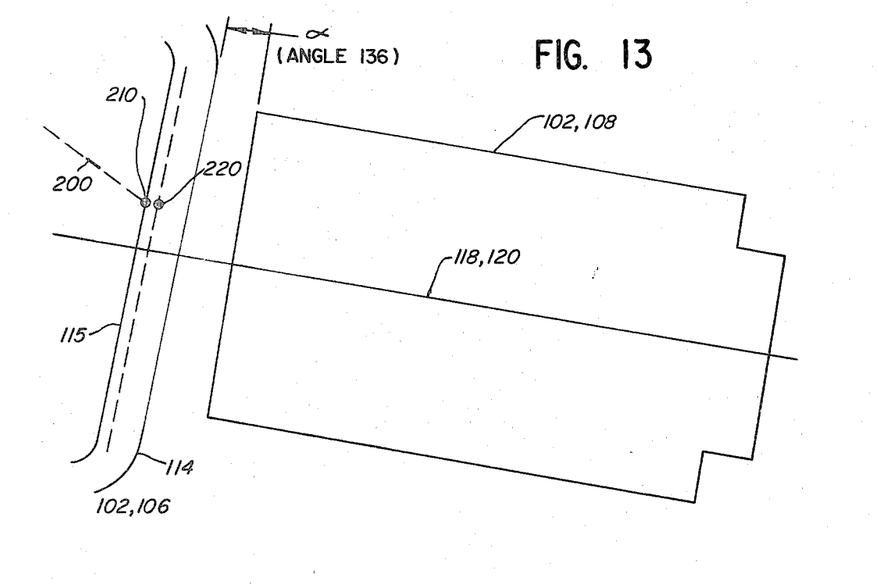

The locations of the outer picture tubes 108 and 112 with respect to their respective lenses 102 or 106 is illustrated in FIG. 13. The faceplate 114 of the picture tube is inclined at an angle 136, designated $\alpha$ in FIG. 13, with respect to the rear surface of the lens. This angle which is selected to make the image of the phosphor screen coincident with the viewing screen, is approximately given by $$\tan \alpha = \frac{\tan \beta}{M}$$

where M is the numerical magnification of the lens.

The lateral position of the picture tube with respect to the lens is also shown in FIG. 13. The electron beam 200 corresponding to deflection conditions producing the geometric center of the picture 128 intersects the phosphor screen 115 on the inside surface of the faceplate 114 to produce an optical object at the point 210. This point is offset from the lens axes 118 and 120 by a distance commensurate with the offset X in FIG. 11 as transformed by the magnification M of the lens.

Figure 14:
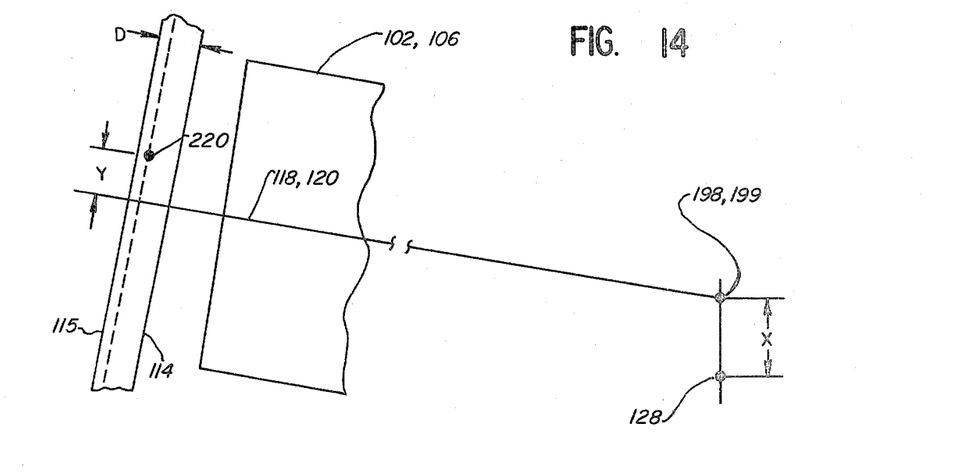

The analysis proceeds as shown in FIG. 14 wherein the known properties of the lens are used to calculate the apparent object point 220 corresponding to the viewing screen point 128 in FIG. 11. To a good approximation $$Y = x/m$$

The apparent object point 220 is displaced from the actual phosphor screen object point 210 because of apparent reduction in the faceplate thickness 230, designated D, resulting from its high index of refraction n=approximately 1.52. The resulting displacement is approximately (n−1)D/n, or 0.34 n.

Figure 15:
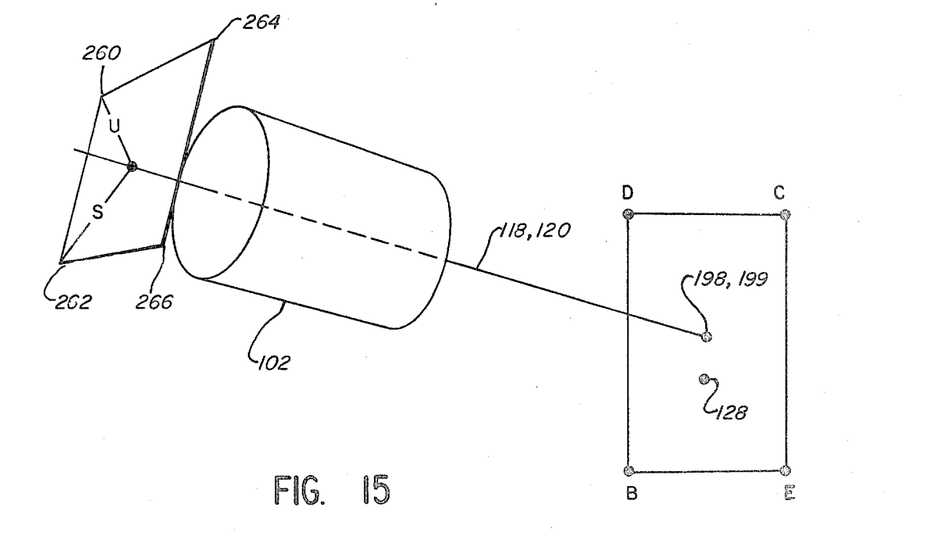

FIG. 15 illustrates the object corner image points 260, 262, 264 and 266 corresponding to the screen corner image points B, C, D and E. It is desired that the brightness of the corners of the image be balanced; i.e., that the optical transmission from image point 260 through the lens and through the viewing screen at point E will equal the optical transmission from point 262 through the lens and viewing screen at point C. This condition occurs when there is equal optical vignetting, which is attained when the distance of any corner object point 260 from the lens axis 118 or 120, designated U, approximately equals the distance of any other corner object point such as 262 from the lens axis, designated S.

These distances, U and S, depend on the convergence angle $\beta$ and the aiming offset distance X, and can be calculated by ray tracing from the image points. An iterative procedure is used to calculate values of X and B which satisfy the lens tangency condition and the equal optical transmission requirement. The mathematical procedure can be one of any number of recognized iterative computer techniques. For example, X (or $\beta$) is chosen as one independent parameter; then $\beta$ (or X) is determined from the tangency condition. Define the function $G(x,\beta(x))$ (or $H(\beta,x(\beta))$) equal to the difference between the optical transmission for the path from point 260 to point E and the optical transmission for the path from point 262 to point C, nominally zero. After initial estimates of X, successively more accurate estimates of $X_j$ for j=1, 2, 3, ... are calculated using a formula such as:

$$X_{j+2} = X_j - \frac{(X_{j+1} - X_j) H_{j+1}}{(H_{j+1} - H_j)}$$

following Newton's method. After a sufficient number of estimates to insure that the calculated value of X is within the desired accuracy bounds, the iterations are deemed complete.

The calculations indicated above are sufficiently time-consuming so that the best way of performing them is by means of a suitably programmed general purpose digital computer. The software required is well within the state of the programming art, and varies according to the programming language employed.

It will now be appreciated that this is a novel skewed outboard lens, in-line color projection TV design which has the advantages of eliminating edge defocussing caused by non-coincidence of projected image focal planes, eliminating color shading due to optical vignetting, and minimizing color shading due to angular separation of the projectors.

The disclosed embodiments are preferred, but there may be other variations of the invention which fall within the scope of the novel principles taught herein. For this reason, the disclosed embodiments are to be taken as merely exemplary, and such variations are intended to be covered by the following claims.

The invention claimed is:

1. In an image projection system of the type comprising:
   a projection screen defining a normal axis;
   lens means having an optical axis, and arranged to focus a projected image upon a surface of said screen;
   said lens means being skewed so that its optical axis is at an acute angle to said screen axis whereby the plane of said projected image has a tendency to be be rotated out of coincidence with said screen surface;
   and image source means having an object image surface and being arranged to provide upon said object image surface an object image for said lens means to project;
   the improvement wherein said image source means is oriented so that said object image surface is angularly displaced from a position of normality relative to said optical axis to the degree necessary to rotate said projected image plane into substantial coincidence with said screen surface.

2. In an image projection system of the type comprising:
   a projection screen defining a normal axis;
   a plurality of lens means having respective optical axes, and arranged to focus respective projected images upon a surface of said screen;
   an orthogonal one of said lens means being oriented so that its optical axis substantially coincides with said screen axis;
   a non-orthogonal one of said lens means being skewed so that its optical axis is at an acute angle to said screen axis,
   and respective image source means each having an object image surface and being arranged to provide upon said object image surface respective object images for said lens means to project;
   said image source means of said orthogonal lens means being oriented so that its object image surface is substantially normal to the optical axis of said orthogonal lens means whereby the plane of the projected image of said orthogonal lens means substantially coincides with said screen surface;
   the improvement wherein said image source means of said non-orthogonal lens means is oriented so that its object image surface is angularly displaced from a position of normality relative to the optical axis of said non-orthogonal lens means in a manner to make the plane of the projected image of said non-orthogonal lens means substantially coincide with said screen surface, whereby said two projected image planes substantially coincide with each other.

3. A system as in claim 2 wherein the spacing between the most closely spaced portions of said lens means is designed, with respect to the set of production tolerances selected by the designer of said system, so that said lens means are tangent to each other whenever, in any particular production sample, said tolerances cumulatively reduce said spacing to the greatest extent possible.

4. A projection television system of the composite image type, comprising:
   a projecting screen defining a normal axis;
   a plurality of lens means having respective optical axes, and arranged to focus respective projected images upon a surface of said screen;
   an orthogonal one of said lens means being oriented so that its optical axis substantially coincides with said screen axis;

a non-orthogonal one of said lens means being skewed so that its optical axis is at an acute angle to said screen axis;

and respective cathode ray tube means arranged to provide respective object images for said lens means which are located upon respective CRT screens;

said cathode ray tube means of said orthogonal lens means being oriented so that its CRT screen is substantially normal to the optical axis of said orthogonal lens means, whereby the projected image of said orthogonal lens means substantially coincides with said projection screen surface;

said cathode ray tube means of said non-orthogonal lens means being oriented so that its CRT screen is angularly displaced from a position of normality relative to the optical axis of said non-orthogonal lens means in a manner to make the plane of the projected image of said non-orthogonal lens means substantially coincide with said projection screen surface, whereby said projected image planes substantially coincide with each other.

5. An image projection system of the kind having:
a projection screen defining a normal axis;
a projector for projecting an image on said projection screen;
said projector having lens means defining an optical axis;
said projector being skewed so that its optical axis is at an acute angle to said projection screen axis whereby its projected image has a tendency to be trapezoidally distorted;
and image source means for said projector including a cathode ray tube having a CRT screen and electron gun means to project an image raster upon said CRT screen which raster is positioned to provide an object image for said lens means;
said electron gun means defining an electron beam axis;
said cathode ray tube being arranged so that said electron beam axis is slanted toward a selected direction to define a non-normal angle relative to said CRT screen so as to pre-distort said object image trapezoidally and oppositely to said distortion tendency of said lens means, whereby its projected image is compensated for trapezoidal distortion;
said object image pre-distortion also resulting in displacement of image points on said raster such that those which are on the trapezoidally enlarged side of said raster are further from, and those which are on the trapezoidally reduced side thereof are closer to, said electron beam axis;
wherein the improvement comprises:
said image source means being arranged to displace said raster in said selected direction relative to said lens means by an appropriate distance to compensate substantially for said image point displacement.

6. An image projection system as in claim 5 wherein all corners of said raster are substantially equidistant from the axis of said lens means.

7. An image projection system as in claim 5 wherein: said raster displacement tends to shift said projected image to an off-center position on said projection screen;
and said lens means is oriented so that its optical axis is underconverged relative to said projection screen axis by a sufficient angle to re-center said projected image on said projection screen.

8. An image projection system as in claim 5 wherein said arrangement for displacing said raster resides in the structure of said cathode ray tube, which comprises a faceplate defining an axis and positioned substantially in line with said lens means, and said electron gun means is assembled with said faceplate in a relationship such that said electron beam axis is displaced in said selected direction from said faceplate axis so as to shift said raster off-center relative to said faceplate.

9. An image projection system as in claim 5 wherein said arrangement for displacing said raster resides in the structure of said cathode ray tube, which comprises means for exerting a unidirectional beam deflection force to shift said raster in said selected direction.

10. An image projection system as in claim 5 wherein said arrangement for displacing said raster resides in the location of said cathode ray tube, which is displaced in said selected direction relative to said lens means so that the center of said raster does not coincide with said optical axis.

11. A system as in claim 5 wherein the spacing between the most closely spaced portions of said lens means is designed, with respect to the set of production tolerances selected by the designer of said system, so that said lens means are tangent to each other whenever, in any particular production sample, said tolerances cumulatively reduce said spacing to the greatest extent possible.

12. A composite image projection system of the kind having:
a projection screen defining a normal axis;
a plurality of projectors for projecting respective images congruently on said projection screen;
said projectors having respective lens means defining respective optical axes;
a non-orthogonal one of said projectors being skewed so that its optical axis at an acute angle to said screen axis whereby its projected image has a tendency to be trapezoidally distorted;
respective image source means for said projectors;
said image source means for said non-orthogonal projector including a cathode ray tube having a CRT screen and electron gun means to project an image raster upon said CRT screen which is positioned to provide an object image for the lens means of said non-orthogonal projector;
said electron gun means defining an electron beam axis;
said cathode ray tube being arranged so that said electron beam axis is slanted toward a selected direction to define a non-normal angle relative to said CRT screen so as to pre-distort said object image trapezoidally and oppositely to said distortion tendency of said lens means of said non-orthogonal projector, whereby its projected image is compensated for trapezoidal distortion;
said object image pre-distortion also resulting in displacement of image points on said raster such that those which are on the trapezoidally enlarged side of said raster are further from, and those which are on trapezoidally reduced side thereof are closer to, said electron beam axis;
wherein the improvement comprises:

said image source means for said non-orthogonal projector being arranged to displace said raster in said selected direction relative to its lens means by an appropriate distance to compensate substantially for said image point displacement;

said raster displacement also tending to shift said projected image of said non-orthogonal projector out of congruence with said projected image of said orthogonal projector;

and said lens means of said non-orthogonal projector being oriented so that its optical axis is underconverged relative to said projection screen axis by a sufficient angle to re-establish congruence between the projected images of said orthogonal and non-orthogonal projectors.

13. An angle projection system comprising:

a projection screen defining a normal axis;

and a projector for projecting an image on a surface of said screen;

said projector having lens means defining an optical axis and arranged to focus a projected image on said projection screen surface;

said lens means being skewed so that said optical axis is at an acute angle to said projection screen axis whereby said projected image has a tendency to be trapezoidally distorted, and a tendency to be rotated out of coincidence with said screen surface;

said projector including image source means to provide an object image for said lens means;

said image source means including a cathode ray tube having a CRT screen and electron gun means to project an object image raster upon said CRT screen;

said CRT screen being positioned so that said image raster provides an object image for said lens means;

said CRT screen being oriented so that said object image is angularly displaced from a position of normality relative to said optical axis to the degree necessary to rotate the plane of its projected image into substantial coincidence with said projection screen surface;

said electron gun means defining an electron beam axis;

said cathode ray tube being arranged so that said electron beam axis is slanted toward a selected direction defining a non-normal angle relative to said CRT screen so as to distort said object image trapezoidally and oppositely to said distortion tendency of said lens means, whereby said projected image is compensated for trapezoidal distortion;

said object image distortion also resulting in displacement of image points on said raster such that those which are on the trapezoidally enlarged side of said raster are further from, and those which are on the trapezoidally reduced side thereof are closer to, said electron beam axis;

said image source means being arranged to displace said raster in said selected direction relative to said lens means by an appropriate distance to compensate substantially for said image point displacement.

14. An image projection system as in claim 13, wherein:

said raster displacement tends to shift said projected image off-center relative to said projection screen;

and said lens means is oriented so that its optical axis is underconverged relative to said projection screen axis by a sufficient angle to re-center said projected image relative to said projection screen.

15. A system as in claim 13 wherein the spacing between the most closely spaced portions of said lens means is designed, with respect to the set of production tolerances selected by the designer of said system, so that said lens means are tangent to each other whenever, in any particular production sample, said tolerances cumulatively reduce said spacing to the greatest extent possible.

16. An in-line composite color image projection system of the type having a projection screen, a plurality of projectors each arranged to project respective different colored portions of a composite image on said screen, each projector including respective lens means having respective optical axes, said lens means being located in side-by-side relation to each other, and at least one of said lens means being skewed so that its optical axis is at an acute angle to said screen axis; the improvement wherein:

the spacing between the most closely spaced portions of said lens means is designed, with respect to the set of production tolerances selected by the designer of said system, so that said lens means are tangent to each other whenever, in any particular production sample, said tolerances cumulatively reduce said spacing to the greatest extent possible.

* * * * *